Sept. 16, 1958  R. L. MIGHELL  2,852,267
DISC PLOW ADJUSTABLE WHEEL
Filed Oct. 4, 1954  2 Sheets-Sheet 1
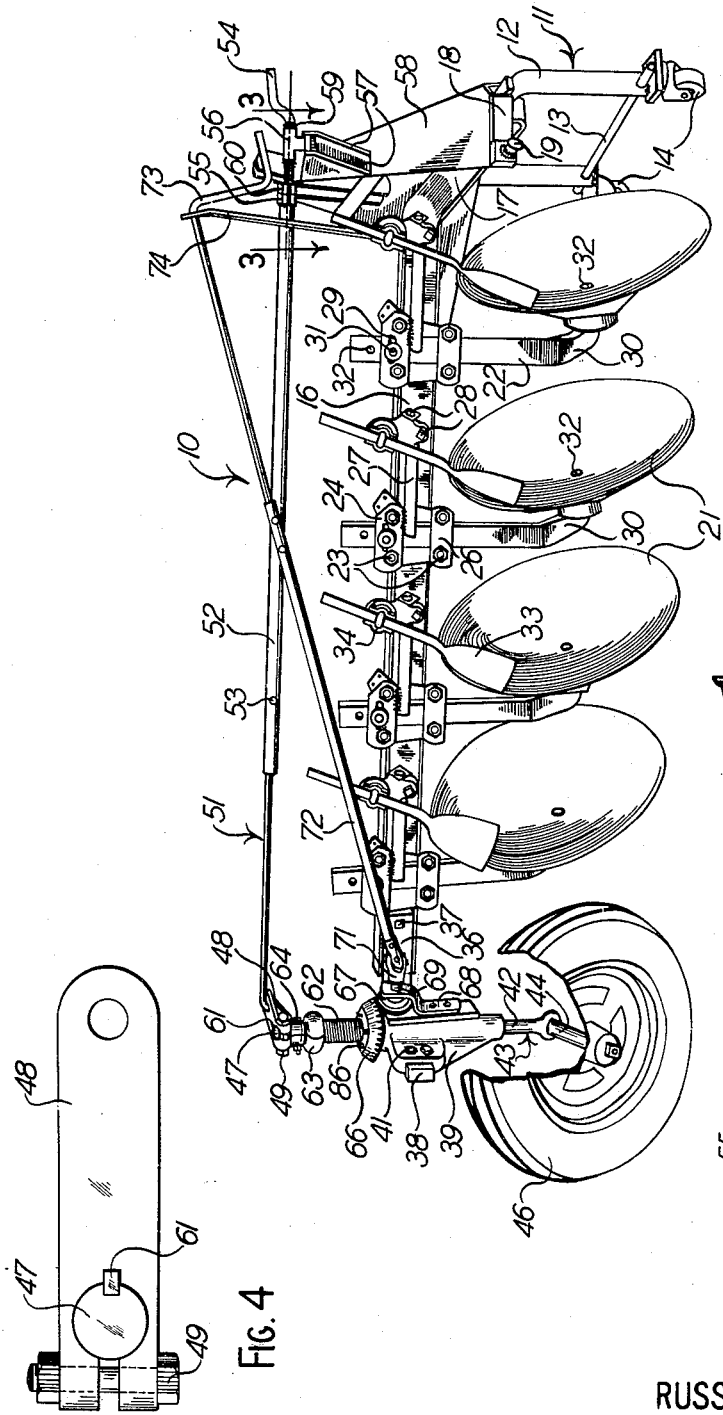
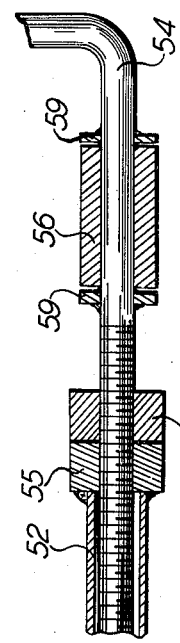
INVENTOR:
RUSSELL L. MIGHELL
BY: Emerson B Donnell
ATTORNEY Sept. 16, 1958 R. L. MIGHELL 2,852,267
DISC PLOW ADJUSTABLE WHEEL
Filed Oct. 4, 1954 2 Sheets-Sheet 2

INVENTOR:
RUSSELL L. MIGHELL

BY: Emerson B Donnell
ATTORNEY

United States Patent Office 2,852,267
Patented Sept. 16, 1958

2,852,267

DISC PLOW ADJUSTABLE WHEEL

Russell L. Mighell, Kewanee, Ill., assignor to J. I. Case Company, Racine, Wis., a corporation of Wisconsin Application October 4, 1954, Serial No. 459,945

3 Claims. (Cl. 280—44)

This invention relates to a shaft adjusting screw and it specifically relates to an agricultural disc plow adjustable wheel mounting.

It is an object of this invention to provide a disc plow with a vertically disposed wheel axle which is vertically adjustable and adjustable about its vertical axis.

Another object of this invention is to provide a disc plow wheel which can be adjusted vertically and directionally with each adjustment independent of the other.

Another object of this invention is to provide a disc plow with the previously stated adjustments to permit the adjustments to be easily and conveniently accomplished by the operator during field use of the plow.

Still another object of this invention is to provide a disc plow with a wheel which can be adjusted vertically and directionally with a maximum of operating efficiency of the adjusting force applied.

Other objects and advantages will become apparent upon reading the folowing description in conjunction with the accompanying drawings, wherein, Fig. 1 is a perspective view of a preferred embodiment of this invention.

Fig. 3 is an enlarged sectional view taken on the line 3—3 of Fig. 1.

Fig. 4 is an enlarged fragmentary top plan view of the upper end of the axle shown in Fig. 1.

Similar reference numerals refer to similar parts throughout the several views.

Figure 2:
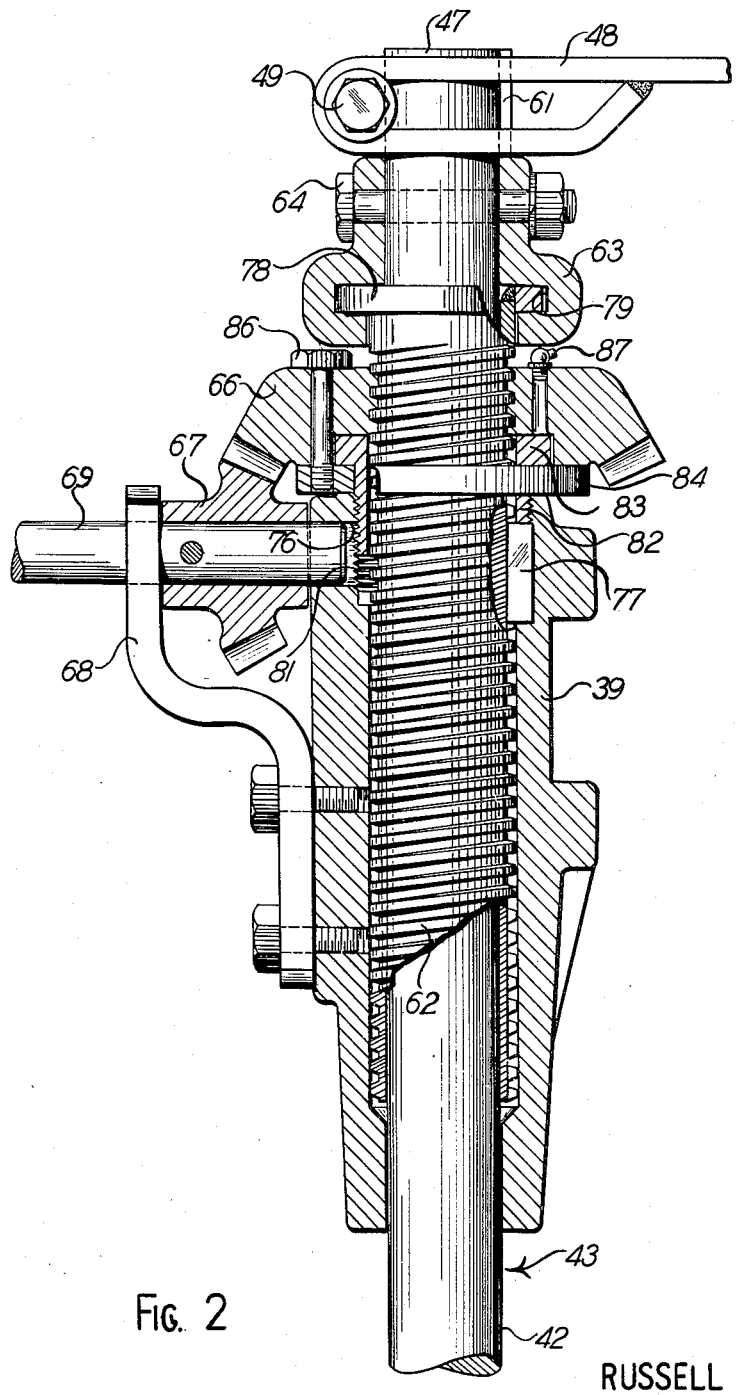
Fig. 2 is an enlarged vertical partially sectional view taken on the axis of the upper end of the wheel axle shown in Fig. 1 but with the parts thereof in a different position.

Fig. 1 shows a disc plow 10 which is attached to a tractor (not shown) in the operation of soil plowing. In the absence of a tractor, the plow 10 is preferably supported at its forward end by a dolly 11, as shown. The latter consists of an inverted U-shaped frame 12 with a support rod 13 extending between the bottom of the frame and a pair of caster wheels 14 attached to the bottom. The dolly can, of course, be suitably bolted to the disc plow 10, and it is removed from the plow when the latter is supported by a tractor in a manner described later. The plow 10 consists of a horizontally disposed beam or frame 16 which is at a slight angle with the direction of movement of the tractor and plow, as usual. The front end 17 of the frame 16 is shown bent downwardly and it connects to a horizontally disposed drawbar 18 extending transversely on the front end of the frame 16. The drawbar is provided at each opposite end with a horizontal hitch pin 19 to which the usual tractor hitch arms attach in a well-known manner.

It is further conventional to provide a plurality of discs 21 depending along the frame 16 on respective mounting standards or axles 22. The latter are preferably bolted to the frame 16 through the usual clamp U-bolts 23 which curve around the frame 16. The free ends of the bolts 23 have plates 24 and 26 mounted thereon with the upper plates 24 attached to the frame 16 through a rod 27 which is secured to the frame by bolts 28 and to the plates by welding, as shown. With this arrangement, the standards or axles are clamped against the frame 16 to secure them in position. Also, the upper plates 24 are each provided with a slot 29 which receives a pin 31 extending through each standard 22 in one of a plurality of holes 32. The standards 22 can thus be vertically adjusted to position the discs 21 a desired distance below the frame 16. The lower ends 30 of the axles 22 are bent to be substantially horizontally disposed and they project through the discs, as shown at 32, to provide a rotation support for the discs.

To complete the frame mountings, a disc scraper 33 is adjustably attached to the frame 16 to engage the concave face of each of the discs and remove dirt therefrom. An adjustable clamp mounting 34, attached to the frame 16 as indicated, provides the attachment stated. It should be understood that more or less than four discs could be mounted on the frame; and, particularly, on the frame shown, some of the discs could be removed as desired for certain plowing operations.

The foregoing description is of a conventional type of disc plow which is used in combination with the hereinafter described structure. A curved beam 36 is attached by bolts, like the bolt 37, to the rear end of the frame 16 to form a part thereof. An end 38 of the beam 36 suitably supports a housing 39 by attachment thereto through bolts 41. Fig. 1 further shows the lower end of a vertically disposed section 42 of a wheel axle 43 projecting below the housing 39 to where it is rigidly attached to an obliquely disposed spindle section 44 of the axle 43. A wheel 46 is rotatably mounted on the axle 43 to be tilted at the usual angle with respect to the longitudinal vertical plane through the plow. The wheel then counteracts the lateral thrust created by the discs during plowing and is also available for supporting the rear end of the plow during transport thereof. Also, the top end 47 of the axle 43 is shown to be engaged by a clamp plate or steering arm 48 to be non-rotatable therewith as described later. It is shown that the plate 48 is split to receive the axle 43 while a bolt 49 secures the two together. The opposite end of the plate 48 attaches to a rod 51 which extends therefrom toward the front end of the plow 10 with a telescoping sleeve 52 held, as a part of the rod, by a pin 53. The sleeve 52 continues the forward extension to where it threadedly receives a crank screw 54 which is supported on the frame 16 by a bearing 56. The latter is mounted on the frame by means of plates 57 which are supported by an upright plate 58 suitably attached to the drawbar 18. The bearing 56 is slightly pivotal about a vertical axis for accommodating the movement of the other end of the rod 51 at the plate 48, as explained later.

Fig. 3 shows a sectional view of the threaded connection between the sleeve 52 and the crank 54, with the sleeve having a threaded portion 55. The crank is rotatably supported by the bearing 56 but is retained in an axially fixed position by a collar 59 on the crank at each side of the bearing. Thus, rotation of the crank will cause the sleeve 52 to be axially displaced and thereby the overall length of the rod is altered and the plate 48 must rotate to accommodate the change.

The top end 47 of the axle and the plate 48 are shown in Fig. 4 to be non-rotatably secured by a key 61 which is received in oppositely disposed keyways in the axle and the plate. Thus, the rotation of the plate 48 is transmitted to the axle 43 and the direction of the wheel 46 is thus determined by the setting of the crank 54 to steer the wheel 46. Fig. 3 further shows a lock nut 60 engaged on the crank 54 for the purpose of being tightened against nut 55 on the crank, after the axle 43 is set, to maintain the set position.

Fig. 1 discloses a lifting screw 62 in the form of a sleeve which is telescoped on the axle 43 to extend interiorly of the housing 39, in a manner described later. The upper end of the screw 62 is defined by a connector, swivel or swivel thrust bearing 63 formed in two halves to encircle the axle 43. A bolt 64 passes through the bearing 63 and the axle 43 to non-rotatably secure them together. Also, a bevel gear 66 is mounted on the sleeve 62 to be threaded therewith and a meshing bevel gear 67 is rotatably attached to the housing 39 by a bracket 68, as shown. A shaft 69 extends from the gear 67 to engage a universal coupler 71 and the latter is connected to a rod 72 to rotate therewith. As shown, the rod 72 extends to the forward end of the plow where it terminates in a crank 73. Like the other rod, the rod 72 is rotatably supported on the frame 16 by an upright member 74 which is mounted on the frame 16 in any conventional manner. With this construction, operation of the crank 73 will rotate the gears 66 and 67 and raise or lower the frame 16 on the screw 62 and the axle 43 through structure hereinafter described.

Fig. 2 shows the assembly set in the maximum raised position with housing 39 having a circular hollow center which receives the screw 62 and through which the axle 43 passes. Also, the side of the housing 39 is preferably recessed at 76 to serve as a bearing for the inner end of the shaft 69 as the latter is then adequately supported on the housing to provide proper support for the gear 67. It will be noted that the screw 62 contains a coaxially disposed keyway in the threads thereof, extending the length of the threaded portion, and a key 77 is disposed in said keyway and in a cooperating keyway in the interior wall of the housing. Thus, the screw is prevented from rotating with respect to the housing but the latter can move axially up and down on the screw.

It should be noted that the upper end of the screw 62 has a circular flange 78 secured thereto and the latter is received in a circular recess 79 on the interior of the bearing 63. The flange 78 is free to rotate in the bearing 63. Since the latter is secured to the axle 43 by the bolt 64, the axial position of the screw 62 is maintained by the axle 43.

The means for axially moving the housing 39 on the screw 62 are shown to consist of the meshing bevel gears 66 and 67 with the gear 66 having screw threads about the interior which engages the screw 62. Thus, the threads on the screw 62 engage the threads on the gear 66 and the latter is concentric on the screw 62. Also, the interior of the upper end of the housing 39 is threaded at 81 to threadedly receive an exteriorly threaded collar 82 which has an upper flange 83 spaced above the upper end of the housing 39. Between the flange 83 and the upper end of the housing 39, a circular thrust washer 84 is disposed to be maintained in the assembly, as shown. The washer 84 is of a larger outer diameter than the flange 83, and, therefore, a plurality of bolts, such as the bolt 86, pass through the gear 66 and into the washer 84 to secure the latter two together. It should be noted that unlike the internal diameter of the gear 66, the internal diameters of the housing 39, the collar 82, and the washer 84 are not threaded. It is further preferred that a grease fitting 87 be located in the gear 66 to permit lubrication of the parts described.

In view of the foregoing, it should be apparent that rotation of the gear 66 will cause the threads on the interior thereof to ride on the screw 62 to raise or lower the frame 16 on the axle 43. Of course, the washer 84 rotates with the gear 66 but prevents the gear from moving axially with respect to the housing since the washer is retained by the housing 39 and the collar 82 which is secured to the housing 39.

While a specific embodiment of this invention has been shown and described, it should be obvious that certain changes can be made within the scope of the invention which should, therefore, be limited only by the appended claims.

I claim:

1. In a tail wheel mounting for a disk plow including a frame and a wheel supported spindle, the combination of an upwardly directed axle section fixed in relation to said spindle, a steering arm fixed on the upper end of said axle section, a thrust bearing fixed on said axle section beneath said steering arm, an externally threaded sleeve journaled on said axle section generally beneath said thrust bearing and having an upwardly disposed outwardly directed flange interengaged with said thrust bearing so as to sustain said thrust bearing against upward displacement relatively to said sleeve, an internally threaded gear wheel threaded on said sleeve beneath said flange, a housing fixed on said frame providing an upwardly directed bore in which said externally threaded sleeve is slidably disposed, a bushing threadedly engaged with the upper end of said housing and having an outwardly directed flange, a thrust washer fixed in relation to said gear wheel between said bushing flange and said housing to secure said gear wheel against upward displacement relatively to said housing, means engaged between said sleeve and said housing permitting axial sliding of said sleeve while securing it against rotation in said housing, a steering rod connected in relation to swing said steering arm and means for rotating said gear wheel, whereby it, and accordingly said housing and frame may be raised and lowered relatively to said axle section, and whereby said wheel supported axle may be turned within said sleeve for steering, without affecting vertical adjustment.

2. In a tail wheel mounting for an agricultural implement including a frame and a wheel supported spindle, the combination of an upwardly directed axle section fixed in relation to said spindle, a steering arm fixed on the upper end of said axle section, a split thrust bearing fixed on said axle section beneath said steering arm, an externally threaded sleeve journaled on said axle section generally beneath said thrust bearing and having an upwardly disposed outwardly directed flange interengaged with said thrust bearing so as to sustain said thrust bearing against upward displacement relatively to said sleeve, an internally threaded gear wheel threaded on said sleeve beneath said flange, a housing fixed on said frame providing an upwardly directed bore in which said externally threaded sleeve is slidably disposed, an outwardly directed flange on said housing, a thrust washer fixed in relation to said gear wheel beneath said housing flange to secure said gear wheel against upward displacement relatively to said housing, means engaged between said sleeve and said housing permitting axial sliding of said sleeve while securing it against rotation in said housing, means connected in relation to swing said steering arm and means for rotating said gear wheel, whereby it, and accordingly said housing and frame may be raised and lowered relatively to said axle section, and whereby said wheel supported axle may be turned within said sleeve for steering, without affecting vertical adjustment.

3. In a tail wheel mounting for an agricultural implement including a frame and a wheel supported spindle, the combination of an upwardly directed axle section fixed in relation to said spindle, a steering arm fixed on the upper end of said axle section, a split thrust bearing fixed on said axle section beneath said steering arm, an externally threaded sleeve journaled on said axle section generally beneath said thrust bearing and having an upwardly disposed outwardly directed flange about which said split thrust bearing is engaged so as to sustain said thrust bearing against upward displacement relatively to said sleeve, internally threaded means on said sleeve beneath said flange, a housing fixed on said frame providing an upwardly directed bore in which said externally threaded sleeve is slidably disposed, an outwardly directed flange on said housing, a thrust washer fixed in relation to said internally threaded means beneath said housing flange to secure said internally threaded means against upward displacement relatively to said housing, means engaged between said sleeve and said housing permitting axial sliding of said sleeve while securing it against rotation in said housing, means connected in relation to swing said steering arm and means for rotating said internally threaded means, whereby it, and accordingly said housing and frame may be raised and lowered relatively to said axle section, and whereby said wheel supported axle may be turned within said sleeve for steering, without affecting vertical adjustment.

References Cited in the file of this patent

UNITED STATES PATENTS

| | | |
|---|---|---|
| 536,306 | Weber | Mar. 26, 1895 |
| 1,192,611 | Field | July 25, 1916 |
| 1,390,867 | Barrett | Sept. 13, 1921 |
| 1,460,799 | Johnson | July 3, 1923 |
| 1,546,471 | Butta | July 21, 1925 |
| 2,225,253 | Beyer | Dec. 17, 1940 |
| 2,372,459 | Todd | Mar. 27, 1945 |

FOREIGN PATENTS

| | | |
|---|---|---|
| 345,411 | Germany | Dec. 9, 1921 |